(12) United States Patent
Napau et al.

(10) Patent No.: US 8,496,098 B1
(45) Date of Patent: Jul. 30, 2013

(54) MANUAL SEAT HEIGHT ADJUSTER MECHANISM

(75) Inventors: Ioan Napau, Troy, MI (US); Mircea Napau, Sterling Heights, MI (US); Mike Chapa, Gross Pointe Park, MI (US); Robert James Bachula, Macomb, MI (US)

(73) Assignee: CRH North America, Inc., Warren, MI (US)

( * ) Notice: Subject to any disclaimer, the term of this patent is extended or adjusted under 35 U.S.C. 154(b) by 816 days.

(21) Appl. No.: 12/342,784

(22) Filed: Dec. 23, 2008

(51) Int. Cl.
F16D 67/02 (2006.01)

(52) U.S. Cl.
USPC .......... 192/15; 192/19; 248/292.12; 248/422; 248/423

(58) Field of Classification Search
USPC ................. 248/419, 422, 423, 425, 292.12, 248/292.13; 297/344.12, 344.17, 338; 192/19, 192/223.2, 15; 74/143, 157, 158
See application file for complete search history.

(56) References Cited

U.S. PATENT DOCUMENTS

| 2,001,668 | A | * | 5/1935 | Maier | ............................ | 192/44 |
|---|---|---|---|---|---|---|
| 4,092,009 | A | | 5/1978 | Koutsky | | |
| 4,236,755 | A | | 12/1980 | Pollitt et al. | | |
| 4,247,071 | A | | 1/1981 | Carella et al. | | |
| 4,289,352 | A | | 9/1981 | Ashworth | | |
| 4,648,575 | A | * | 3/1987 | Kawade | ........................ | 248/371 |
| 4,720,070 | A | | 1/1988 | Nishino | | |
| 4,762,366 | A | * | 8/1988 | Bauer et al. | ................ | 297/367 R |
| 4,973,105 | A | | 11/1990 | Itou | | |
| D331,871 | S | | 12/1992 | Burke | | |
| 5,366,243 | A | | 11/1994 | Ray et al. | | |
| 5,393,098 | A | | 2/1995 | Thomas et al. | | |
| 5,924,731 | A | | 7/1999 | Sayles et al. | | |
| 5,957,426 | A | | 9/1999 | Brodersen | | |
| 6,212,965 | B1 | * | 4/2001 | Hochmuth | ....................... | 74/144 |
| 6,230,867 | B1 | * | 5/2001 | Schwarzbich | .............. | 192/223.2 |
| 6,361,109 | B1 | | 3/2002 | Tokarz et al. | | |
| 6,478,378 | B2 | | 11/2002 | Mühlberger et al. | | |
| 6,481,557 | B2 | * | 11/2002 | Denis | ......................... | 192/223.2 |
| 6,484,995 | B1 | * | 11/2002 | Nemoto | ......................... | 248/421 |
| 6,488,134 | B2 | * | 12/2002 | Becker et al. | .................... | 192/19 |
| 6,511,032 | B1 | | 1/2003 | Lee | | |
| 6,675,945 | B2 | * | 1/2004 | Kim | ............................... | 192/223 |
| 6,733,075 | B2 | | 5/2004 | Schumann et al. | | |
| 7,032,731 | B2 | * | 4/2006 | Kim | ............................... | 192/15 |
| 8,051,967 | B2 | * | 11/2011 | Hochmuth | ....................... | 192/38 |
| 2002/0084688 | A1 | * | 7/2002 | Mitsuhiro | ................... | 297/463.1 |
| 2003/0183472 | A1 | * | 10/2003 | Nemoto | ......................... | 192/43.1 |
| 2005/0006193 | A1 | * | 1/2005 | Kim | ............................... | 192/15 |
| 2005/0056518 | A1 | * | 3/2005 | Weber | ......................... | 192/223.1 |
| 2009/0184554 | A1 | * | 7/2009 | Paing et al. | .................... | 297/358 |
| 2009/0267397 | A1 | * | 10/2009 | Kubota | ....................... | 297/344.15 |
| 2009/0273218 | A1 | * | 11/2009 | Park | ........................... | 297/284.6 |
| 2010/0109406 | A1 | * | 5/2010 | Ueda | ............................ | 297/358 |
| 2011/0266851 | A1 | * | 11/2011 | Kim | .......................... | 297/344.12 |

* cited by examiner

Primary Examiner — Terrell McKinnon
Assistant Examiner — Eret McNichols
(74) Attorney, Agent, or Firm — Bliss McGlynn, P.C.

(57) ABSTRACT

A manual seat height adjuster mechanism for a seat of a vehicle includes a freewheel brake mechanism having a rotatable output pinion to engage and rotate an adjustment component of the seat to adjust a height of the seat and a locking mechanism selectively engagable and disengageable with the freewheel brake mechanism to allow the height of the seat to be adjusted and to prevent the height of the seat from moving once the height has been adjusted.

10 Claims, 12 Drawing Sheets

US 8,496,098 B1

MANUAL SEAT HEIGHT ADJUSTER MECHANISM

BACKGROUND OF THE INVENTION

1. Field of the Invention

The present invention relates generally to seats for vehicles and, more specifically, to a manual seat height adjuster mechanism for an automotive vehicle.

2. Description of the Related Art

It is known to provide a seat for a vehicle such as an automotive vehicle. Typically, the seat includes a generally horizontal seat portion and a generally vertical back portion operatively connected to the seat portion. The seat may include at least one, preferably a pair of tracks to allow horizontal adjustment of the seat portion and a pivoting mechanism to allow vertical adjustment of the seat portion. The height of the seat portion may be manually adjusted or by power. After the seat portion is adjusted upward, vibration and load over time may cause the seat portion to move downward, resulting in a loss of height.

Therefore, it is desirable to provide a seat height adjuster mechanism for a seat of a vehicle that prevents downward movement of the seat portion over time. It is also desirable to provide a seat height adjuster mechanism for a seat of a vehicle that allows manual adjustment of the seat portion, but prevents downward movement of the seat portion after adjustment. It is further desirable to provide a seat height adjuster mechanism for a seat of a vehicle that provides a mechanical engagement to prevent movement of the seat portion once it is adjusted. Thus, there is a need in the art to provide a manual seat height adjuster mechanism that meets at least one of these desires.

SUMMARY OF THE INVENTION

It is, therefore, one object of the present invention to provide a new seat height adjuster mechanism for a seat of a vehicle.

It is another object of the present invention to provide a manual seat height adjuster mechanism for a seat of a vehicle with a locking feature.

It is yet another object of the present invention to provide a seat height adjuster mechanism with a mechanical locking feature.

To achieve one or more of the foregoing objects, the present invention is a manual seat height adjuster mechanism for a seat of a vehicle. The manual seat height adjuster mechanism includes a freewheel brake mechanism having a rotatable output pinion to engage and rotate an adjustment component of the seat to adjust a height of the seat. The manual seat height adjuster mechanism also includes a locking mechanism selectively engagable and disengageable with the freewheel brake mechanism to allow the height of the seat to be adjusted and to prevent the height of the seat from moving once the height has been adjusted.

One advantage of the present invention is that a new manual seat height adjuster mechanism is provided for a seat of a vehicle that prevents downward movement of the seat after adjustment. Another advantage of the present invention is that the manual seat height adjuster mechanism prevents downward movement of the seat once adjusted by positive mechanical engagement. Yet another advantage of the present invention is that the manual seat height adjuster mechanism has a mechanical locking feature that prevents rotation of a freewheel brake mechanism once the seat is adjusted. Still another object of the present invention is that the manual seat height adjuster mechanism allows manual adjustment of a height of the seat, but prevents loss of height of the seat over time due to load and vibration.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
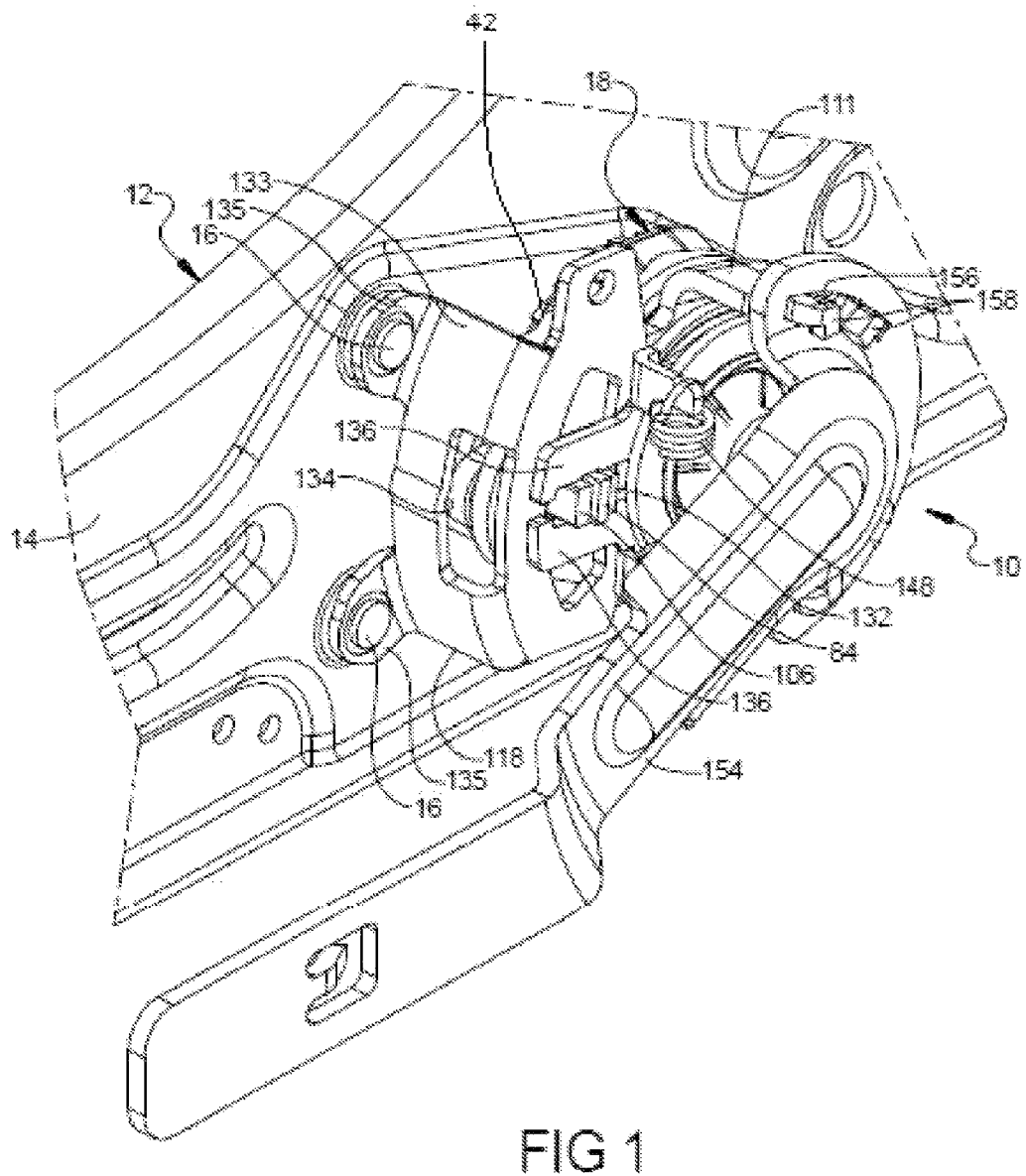
FIG. 1 is a perspective view of a manual seat height adjuster mechanism, according to the present invention, illustrated in operational relationship with a seat of a vehicle.
Figure 2:
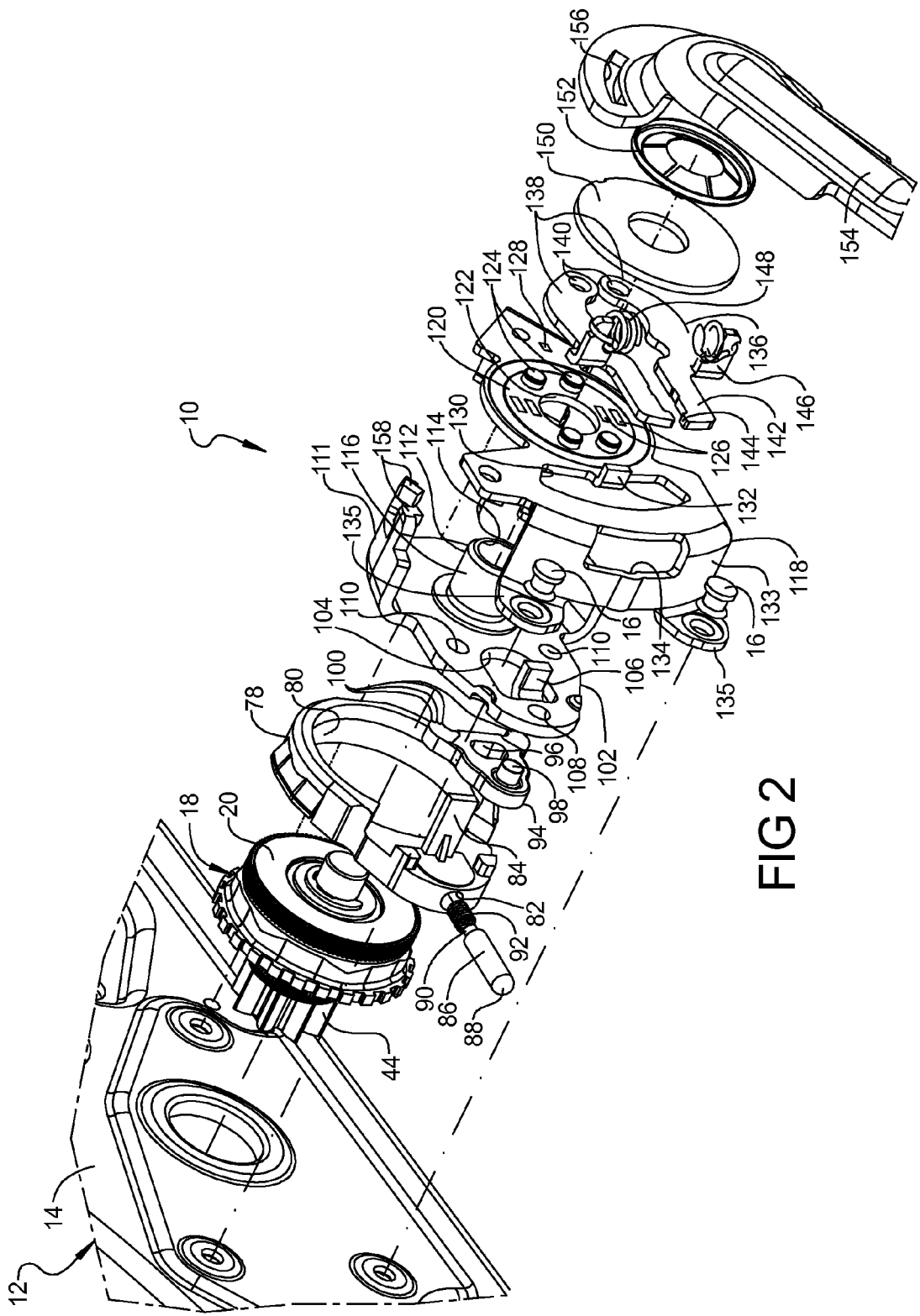
FIG. 2 is an exploded perspective view of manual seat height adjuster mechanism of FIG. 1.
Figure 3:
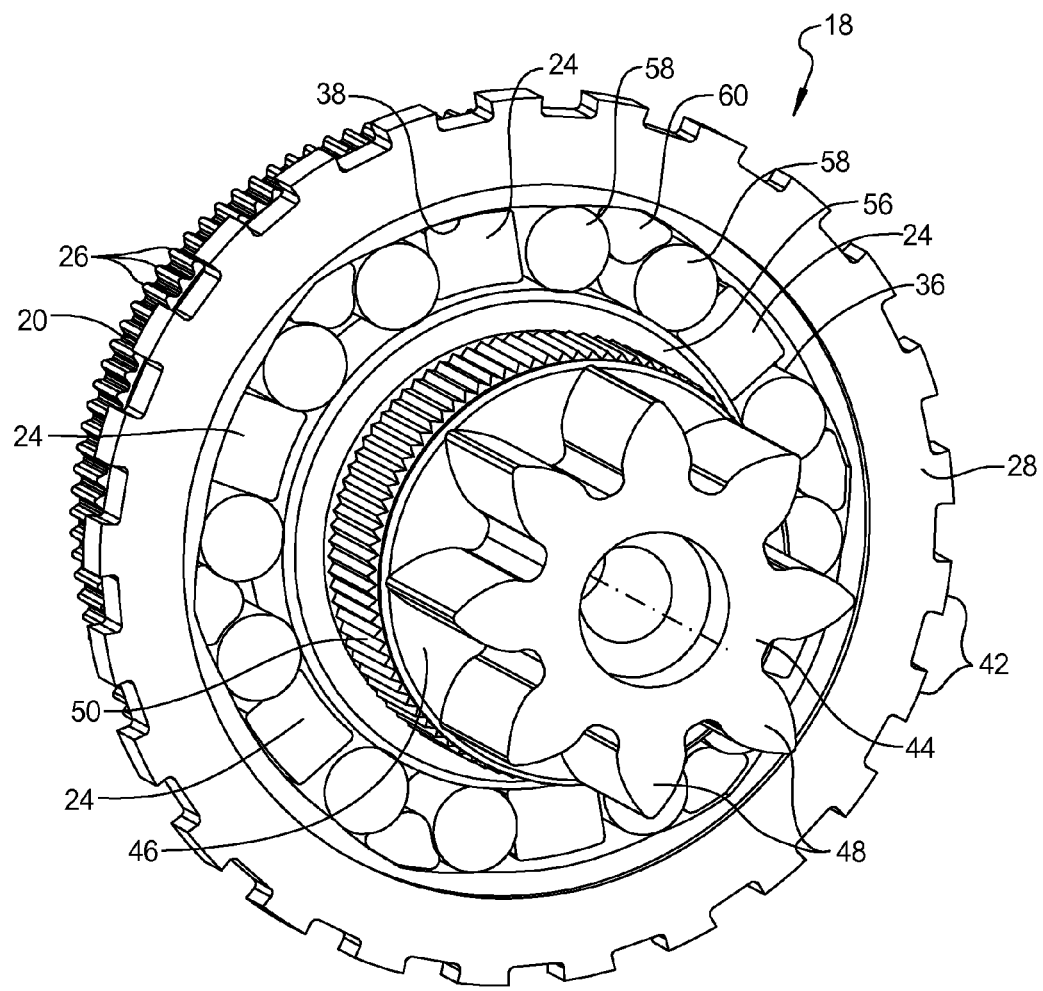
FIG. 3 is a perspective view of a portion of the manual seat height adjuster mechanism of FIG. 3.
Figure 4:
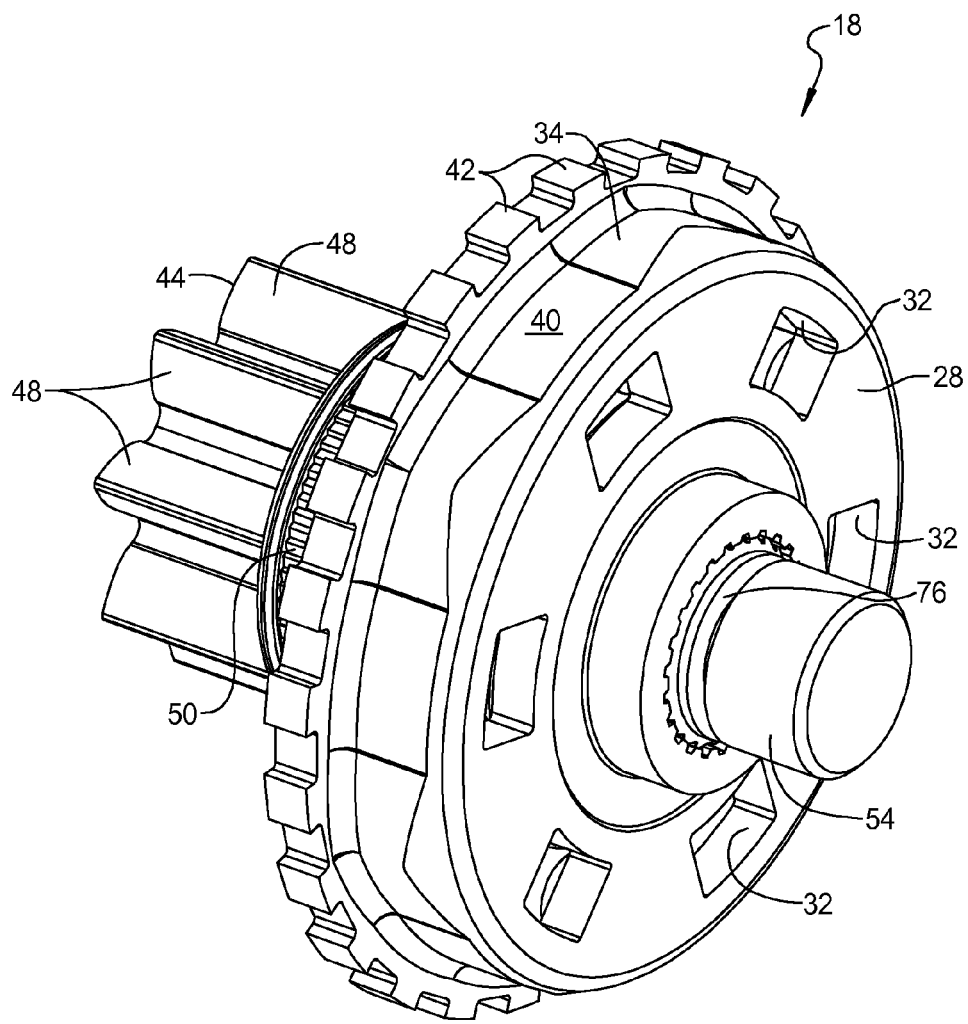
FIG. 4 is a perspective view of a reverse side of the portion of the manual seat height adjuster mechanism of FIG. 3 with a ratchet gear removed.
Figure 5:
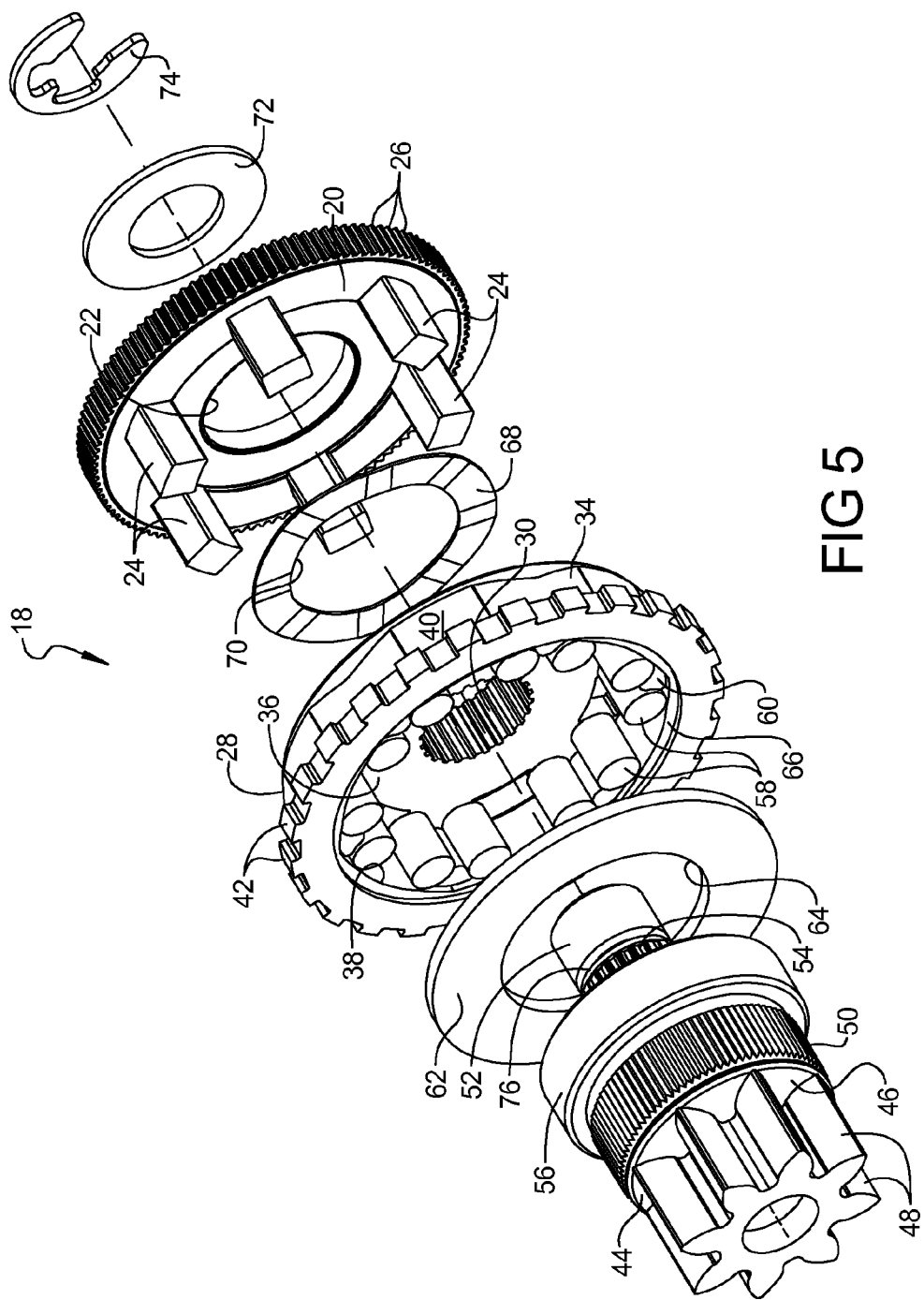
FIG. 5 is an exploded perspective view of the portion of the manual seat height adjuster mechanism of FIG. 3.

Referring now to the drawings, and in particular FIGS. 1 through 3, one embodiment of a manual seat height adjuster mechanism 10, according to the present invention, is shown for adjusting a height of a seat, generally indicated at 12, in a vehicle (not shown) such as an automotive vehicle. The seat 12 includes a seat frame 14 (partially shown) and an adjuster component such as a sector gear or rack (not shown) to adjust the height of the seat 12. The manual seat height adjuster mechanism 10 is secured to the seat frame 14 by a suitable mechanism such as fasteners 16. It should be appreciated that the manual seat height adjuster mechanism 10 is activated by a person (not shown) to manually adjust a height of the seat 12 relative to a floorpan (not shown) of a vehicle body (not shown) of the vehicle.

Referring to FIGS. 2 through 5, the manual seat height adjuster mechanism 10 includes a freewheel brake mechanism, generally indicated at 18, to engage the adjuster component. The freewheel brake mechanism 18 includes a driving wheel or ratchet gear 20. The ratchet gear 20 is generally circular in shape and has an aperture 22 extending axially therethrough. The ratchet gear 20 has a plurality of ribs or fingers 24 extending axially and spaced circumferentially on one side for a function to be described. The ratchet gear 20 also has a plurality of external teeth 26 disposed and spaced circumferentially about a periphery thereof. It should be appreciated that the ratchet gear 20 is a driving component.

The freewheel brake mechanism 18 also includes a brake housing 28 cooperating with the ratchet gear 20. The brake housing 28 is generally circular in shape and has a central splined aperture 30 extending axially therethrough. The brake housing 28 also has a plurality of slots 32 spaced circumferentially and radially about the aperture 30 and extending axially therethrough to receive the fingers 24 of the ratchet gear 20. The brake housing 28 has a flange 34 extending axially and circumferentially to form a cavity 36. The flange 34 has an interior surface 38 and an exterior surface 40 with a plurality of teeth 42 spaced circumferentially thereabout. It should be appreciated that the brake housing 28 is rotated by the ratchet gear 20.

The freewheel brake mechanism 18 includes an output pinion 44 to engage the adjuster component. The output pinion 44 has a base 46 that is generally cylindrical in shape and a plurality of teeth 48 spaced circumferentially and extending axially from the base 46. The base 46 has a knurled surface 50. The output pinion 44 also has a generally cylindrical shaft 52 extending axially from the base 46. The shaft 52 has a portion with a plurality of splines 54 to engage the splined central aperture 30 of the brake housing 28 to form a spline connection. It should be appreciated that the output pinion 44 and brake housing 28 rotate together due to the spline connection.

The freewheel brake mechanism 18 also includes a bushing 56 disposed about the base 46 of the output pinion 44. The bushing 56 is generally circular in shape. The bushing 56 is secured to the base 46 by the knurled surface 50. It should be appreciated that the bushing 56 is fixed relative to the output pinion 44.

The freewheel brake mechanism 18 includes a plurality of needle rollers 58 disposed in the cavity 36 of the brake housing 28. The rollers 58 are generally cylindrical in shape and spaced about the cavity 36 of the brake housing 28. The rollers 58 contact the interior surface 38 of the brake housing 28 and the outer surface of the bushing 56. It should be appreciated that a pair of rollers 58 is disposed circumferentially between a pair of fingers 24 of the ratchet gear 20.

The freewheel brake mechanism 18 also includes a plurality of elastic elements or inserts 60 disposed in the cavity 36 of the brake housing 28. The elastic inserts 60 are generally cylindrical in shape and spaced about the cavity 36 of the brake housing 28. The elastic inserts 60 contact the interior surface 38 of the brake housing 28. It should be appreciated that one elastic insert 60 is disposed circumferentially between one pair of rollers 58. It should be appreciated that positioning the needle rollers 58 on either side of the elastic insert 60 enables a self-locking function and resists rotation of the brake housing 28.

The freewheel brake mechanism 18 includes a retaining plate 62 disposed over the cavity 38 to retain the rollers 58 and inserts 60 therein. The retaining plate 62 is generally circular in shape and has an aperture 64 extending axially therethrough to receive the shaft 54 of the output pinion 44. The retaining plate 62 is snap-fit into a recessed ledge 66 of the brake housing 28 about the cavity 36.

The manual seat height adjuster mechanism 10 also includes a wavy or spring washer 68 disposed between the ratchet gear 20 and the brake housing 28. The spring washer 68 is generally circular in shape and has an aperture 70 extending axially therethrough to receive the shaft 54 of the output pinion 44.

The manual seat height adjuster mechanism 10 includes a flat washer 72 and an external retaining ring 74 to retain the ratchet gear 20 and the output pinion 44 together. The washer 72 is disposed about the shaft 54 of the output pinion 44 and the retaining ring 74 is disposed in a groove 76 about the shaft 54. It should be appreciated that, except for the teeth 42 of the brake housing 28, the freewheel brake mechanism 18 is conventional and known in the art.

Referring to FIGS. 1, 2, and 6 through 9, the manual seat height adjuster mechanism 10 includes a rotational fixation bracket 78 disposed about the brake housing 28 of the freewheel brake mechanism 18. The rotational fixation bracket 78 is generally circular in shape and has an aperture 80 extending axially therethrough to receive the freewheel brake mechanism 18. The rotational fixation bracket 78 has a cavity 82 extending radially therein for a function to be described. The rotational fixation bracket 78 has a tab 84 extending axially for a function to be described. The rotational fixation bracket 78 is made of a plastic material.

The manual seat height adjuster mechanism 10 also includes a retention pin 86 for locating a neutral position. The retention pin 86 is generally cylindrical in shape and is slidably disposed in the cavity 82 of the rotational fixation bracket 78. The retention pin 86 has an arcuate shaped end 88 for engagement with a recess in a cover plate 118 to be described. The retention 86 pin has a reduced diameter end 90 at the other end. The manual seat height adjuster mechanism includes a spring 92 disposed in the cavity 82 of the rotational fixation bracket 78 and about the reduced diameter end 90 urge the arcuate shaped end 88 of the retention pin 86 into engagement with the cover plate 118.

The manual seat height adjuster mechanism 10 includes a carrier 94 disposed between an actuating lever 102 to be described and the rotational fixation bracket 78 for cooperating with the freewheel brake mechanism 18. The carrier 94 is generally "A" shaped and has an aperture 96 extending axially therethrough to receive the tab 84 of the rotational fixation bracket 78. The carrier 94 also includes a projection 98 extending axially near its peak and a plurality of teeth 100 at each spaced apart leg that cooperate with the teeth 26 of the ratchet gear 20 of the freewheel brake mechanism 18. It should be appreciated that the carrier 94 pivots about an axis through the projection 98.

The manual seat height adjuster mechanism 10 also includes an actuating lever 102 to actuate the freewheel brake mechanism 18. The actuating lever 102 has an aperture 104 extending therethrough to receive the tab 84 of the rotational fixation bracket 78. The actuating lever 102 has a tab 106 extending generally perpendicular thereto adjacent the aperture 104. The actuating lever 102 has an aperture 108 extending axially therethrough and spaced radially from the aperture 104 to receive the projection 98 of the carrier 94. The actuating lever 102 has a plurality of, preferably two, posts 110 spaced from each other and the tab 106 for a function to be described. The actuating lever 102 further has an arm 111 extending radially for connection to a control lever 154 to be described.

The manual seat height adjuster mechanism 10 includes a bearing bushing 112 on the actuating lever 102. The bushing 112 is generally cylindrical in shape and has an aperture 114 extending axially therethrough to receive the shaft 54 of the freewheel brake mechanism 18. The bushing 112 has a reduced diameter portion 116 for a function to be described.

The manual seat height adjuster mechanism 10 also includes a cover plate 118 secured to the frame 14 of the seat 12. The cover plate 118 has a center portion 120 that is generally circular in shape and has an aperture 122 extending axially therethough to receive the reduced diameter portion 116 of the bushing 112. The center portion 120 also has a plurality of posts 124 spaced from the aperture 122. In the embodiment illustrated, two posts 124 are disposed opposite each other. The center portion 120 includes a plurality of slots 126 spaced from the aperture 122 and extending therethrough. In the embodiment illustrated, two slots 126 are disposed opposite each other. The center portion 120 has an aperture 128 spaced from a pair of the posts 124 and extending therethrough for a function to be described. The center portion 120 also has an aperture 130 extending therethrough to receive the tabs 84 and 106. The center portion 120 further has a tab 132 extending axially adjacent the aperture 130 and the tabs 84 and 106.

The cover plate 118 has a side portion 133 extending generally perpendicular to the center portion 120. The side portion 133 has a recess 134 to receive the arcuate shaped end 88 of the retention pin 86 and define a neutral position for the manual seat height adjuster mechanism 10. The side portion 133 also has a pair of leg portions 135 extending outwardly and spaced from each other to be secured to the frame 14 of the seat 12 by the fasteners 16. It should be appreciated that the cover plate 118 is fixed relative to the frame 14 of the seat 12.

The manual seat height adjuster mechanism 10 includes a pair of spring holder brackets 136 disposed about the bushing 112 on one side of the cover plate 118. Each spring holder bracket 136 has an arcuate portion 138 with an aperture 140 extending therethrough to receive a post 124 of the cover plate 118. Each spring holder bracket 136 has an arm portion 142 extending from the arcuate portion 138. The arm portion 142 has a finger 144 extending inwardly. The arm portion 142 also has a tab 146 extending axially for a function to be described. It should be appreciated that the spring holder brackets 136 are conventional and known in the art.

The manual seat height adjuster mechanism 10 also includes a tension spring 148. In the embodiment illustrated, the tension spring 148 has one end connected to one tab 146 of one spring holder bracket 136 and has another end connected to one tab 146 of the other spring holder bracket 136. It should be appreciated that the tension spring 148 is conventional and known in the art.

The manual seat height adjuster mechanism 10 includes a washer 150 disposed about the bushing 112 adjacent the spring holder brackets 136 and a retaining ring 152 disposed about the bushing 112 adjacent the washer 150. It should be appreciated that the washer 150 and retaining ring 152 are conventional and known in the art.

Figure 10:
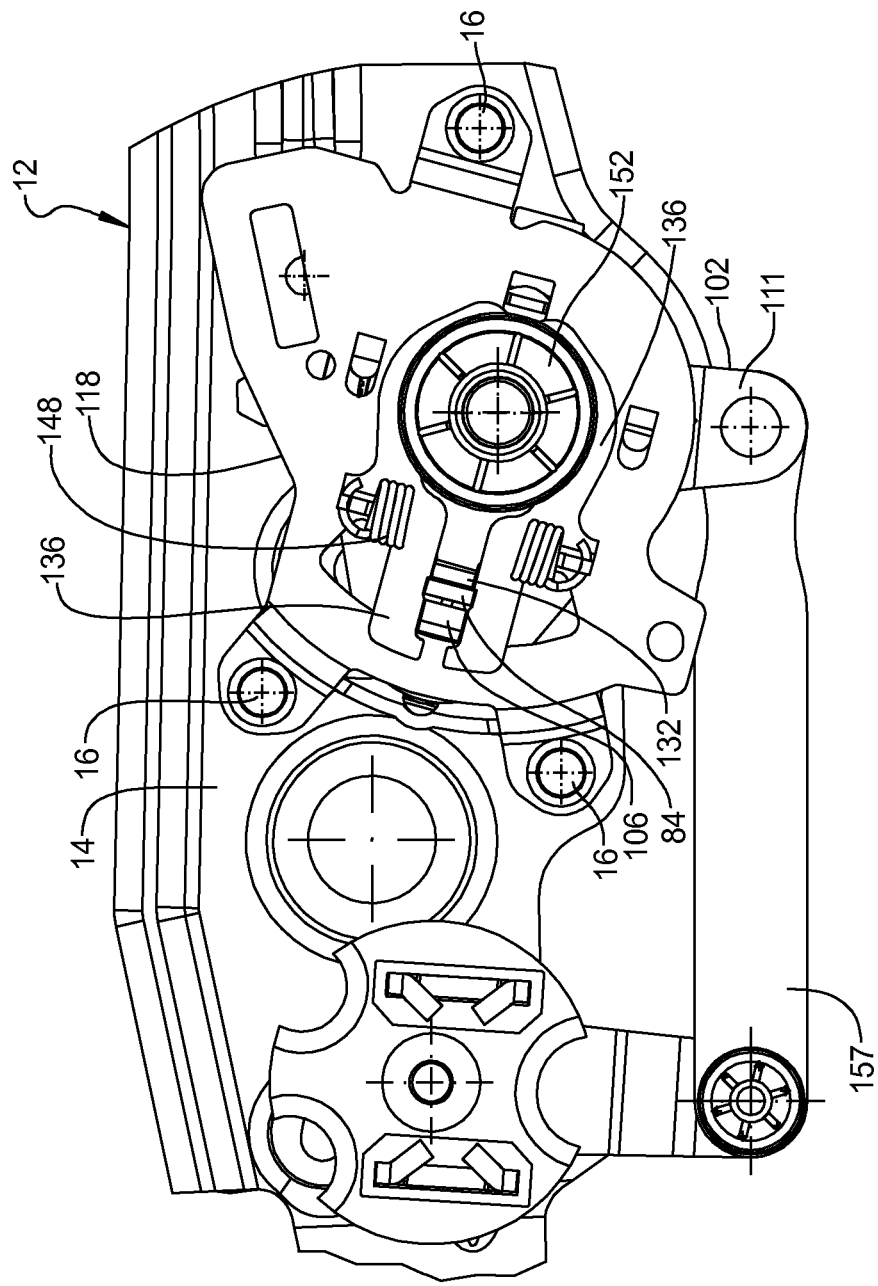
FIG. 10 is a front elevational view of the manual seat height adjuster mechanism of FIG. 1 illustrating a first operational state.
Figure 11:
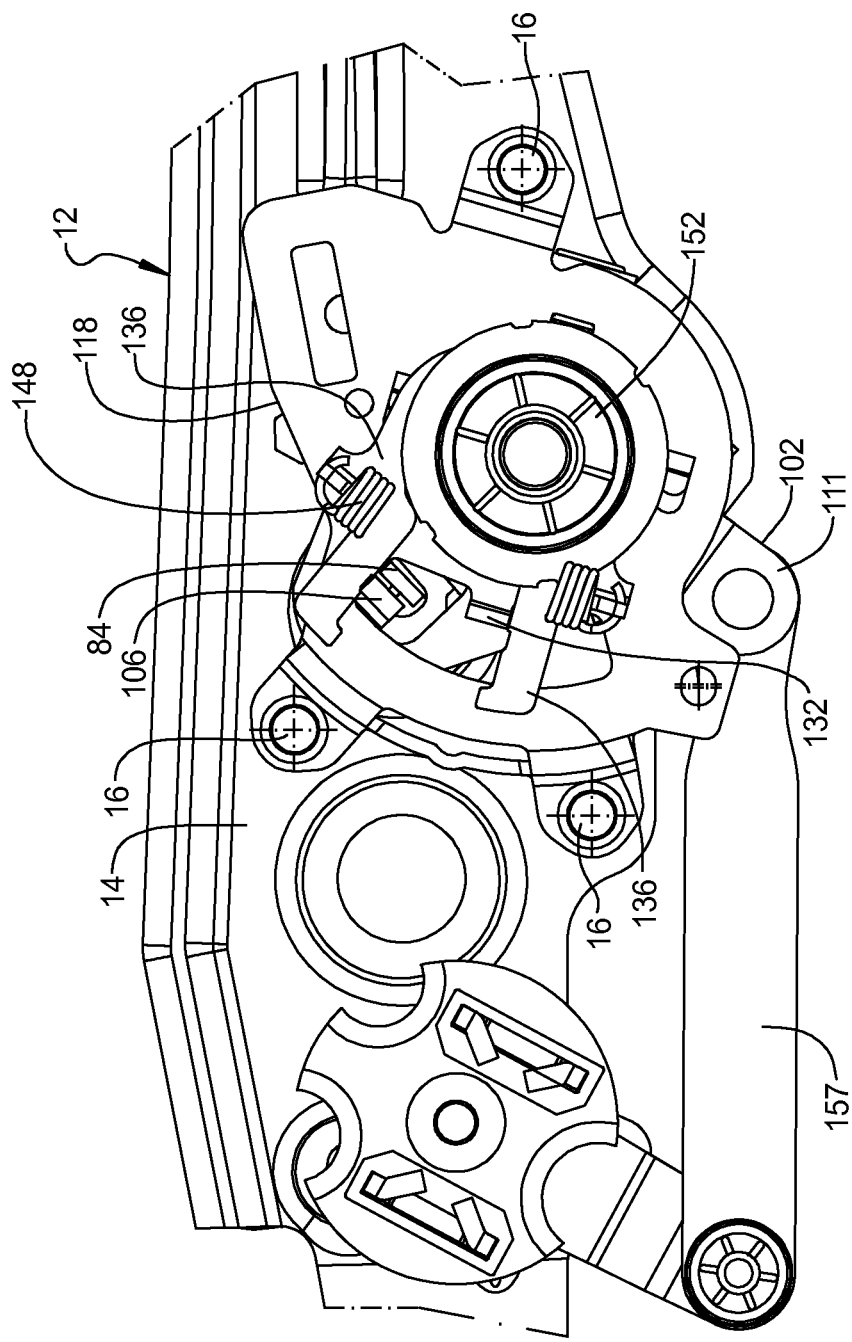
FIG. 11 is a view similar to FIG. 10 illustrating a second operational state of the manual seat height adjuster mechanism.

The manual seat height adjuster mechanism 10 also includes a control lever 154 cooperating with the actuating lever 102. As illustrated in FIGS. 1 and 2, the control lever 154 may be a direct connection by a generally elongated handle having a plurality of apertures 156 at one end to receive tabs 158 on the arm portion 111 of the actuating lever 102. As illustrated in FIGS. 10 and 11, the control lever 154 may be a remote connection by a linkage 157 to a remote control lever. It should be appreciated that the control lever 154 rotates the actuating lever 102. It should also be appreciated that the control lever 154 is conventional and known in the art.

Referring to either FIG. 1 or 10, the manual seat height adjuster mechanism 10 is in a neutral position. By manually operating either the control lever 154 or the linkage 157 through the remote control lever, the movement is transmitted to the actuating lever 102, which will rotate around a central axis through the bushing 112. The retention pin 86 will move radial from its neutral position and will create a pressure on the rotational fixation bracket 78 through the compression spring 92. The carrier 94 will rotate relative to the actuating lever 102 around a remote axis through the projection 98 and the aperture 108. Due to the pin connection between actuating lever 102 and the toothed carrier 94, both connected parts will rotate together around the central axis. Because the rotational fixation bracket 78 remains fixed in its neutral position during this time, the carrier 94 will be tilted around the remote axis. The rotational fixation bracket 78 will be elastically deformed such that the teeth 100 of the carrier 94 will positively engage with the teeth 26 of the ratchet gear 20 of the freewheel brake mechanism 18.

During a drive motion to a rotated position as illustrated in FIG. 11, the actuating lever 102 moves one of the spring holder brackets 136 and the tension spring 148 away from the tab 132 on the cover plate 118. As the actuating lever 102 rotates the ratchet gear 20 due to the engagement between the teeth 100 and 26, the fingers 24 on the ratchet gear 20 engage and move the rollers 58 together with the brake housing 28 around the fixed bushing 56 of the freewheel brake mechanism 18. The brake housing 28 and therefore the output pinion 44 rotate relative to the fixed locking bushing 56. During this rotation, the rollers 58 are not wedged. The rollers 58 rotate with the brake housing 28 around the bushing 56. The rotation of the output pinion 44 will activate an adjuster component such as a sector gear or rack to adjust the height of the seat 12. It should be appreciated that the adjuster component is conventional and known in the art.

On the return motion of the control lever 154 being released after a drive motion, this return motion is actuated by the spring holder bracket 136 and the tension spring 148. The still engaged toothed carrier 94 that was utilized for the previously performed drive motion is moved away for disengagement of its teeth 100 with the teeth 26 of the ratchet gear 20. It should be appreciated that, during disengagement, the rotational fixation bracket 78 will force the carrier 94 to oscillate about the remote axis relative to the actuating lever 102 and the moved parts will reach the allowed neutral position after a rotation of the drive motion. It should also be appreciated that the movement is similar in the opposite drive direction.

When this rotation stops after the drive motion, the output pinion 44 starts to rotate in reverse. The elastic insert 60 of a companion pair of rollers 58 wedge against the rollers 58 to lock the brake housing 28 against reverse rotation. Through this wedging, each roller 58 contacts the interior surface 38 of the brake housing 28 and the surface of the bushing 56. The elastic insert 60 forces the rollers 58 outward into the increasingly narrow space between the brake housing 28 and the bushing 56. This acts as a brake to prevent rotation of the brake housing 28, thereby resisting seat height adjustment. It should be appreciated that a certain resistance to rotation of the output pinion 44 is effected by pushing the rollers 58 along the surfaces and thereby wedging them with the elastic inserts 60. It should also be appreciated that the rollers 58 are released by the fingers 24 of the ratchet gear 20. It should further be appreciated that the wedged position can only be released if the ratchet gear 20 is activated.

Referring to FIGS. 6 through 9, the manual seat height adjuster mechanism 10 includes a locking mechanism, generally indicated at 160, to prevent reverse rotational movement of the output pinion 44 and brake housing 28. Over time, load or weight on the seat 12 and vibrations from the vehicle may cause the elastic inserts 60 to be deformed due to their elasticity. This deformation will allow a small amount of rotation of the brake housing 28, which will result in the loss of height of the seat 12. To overcome this, the locking mechanism 160 positively and mechanically engages the freewheel brake mechanism 18. It should be appreciated that the locking mechanism 160 prevents the freewheel brake mechanism 18 from rotating in a reverse direction.

The locking mechanism 160 includes a locking plate 162 to engage and disengage the teeth 42 of the brake housing 28. The locking plate 162 has a base portion 164 extending radially with an aperture 166 extending axially therethrough to receive the bushing 112. The base portion 164 has a tab 168 extending axially adjacent the aperture 166 for sliding in the slot 128 of the cover plate 118. The base portion 164 has a pair of cam portions 170 extending outwardly to engage the posts 110 of the actuating lever 102. The locking plate 162 also has an arm portion 172 extending axially from the base portion 164. The arm portion 172 has a flange 174 extending radially to engage and disengage spaces between the teeth 42 of the brake housing 28. It should be appreciated that the locking plate 162 moves radially and slides linearly on the actuating lever 102.

The locking mechanism 160 also includes a tension spring 176 cooperating with the locking plate 162. The tension spring 176 is a wire spring member having an inverted general "V" shaped portion 178 that is disposed over the tab 168 of the locking plate 162 and arm portions 180 extending outwardly from the ends of the V-shaped portion 178 and disposed over tabs 179 in the cover plate 118. It should be appreciated that the tension spring 176 urges the flange 174 of the locking plate 162 into engagement with the brake housing 28.

Figure 6:
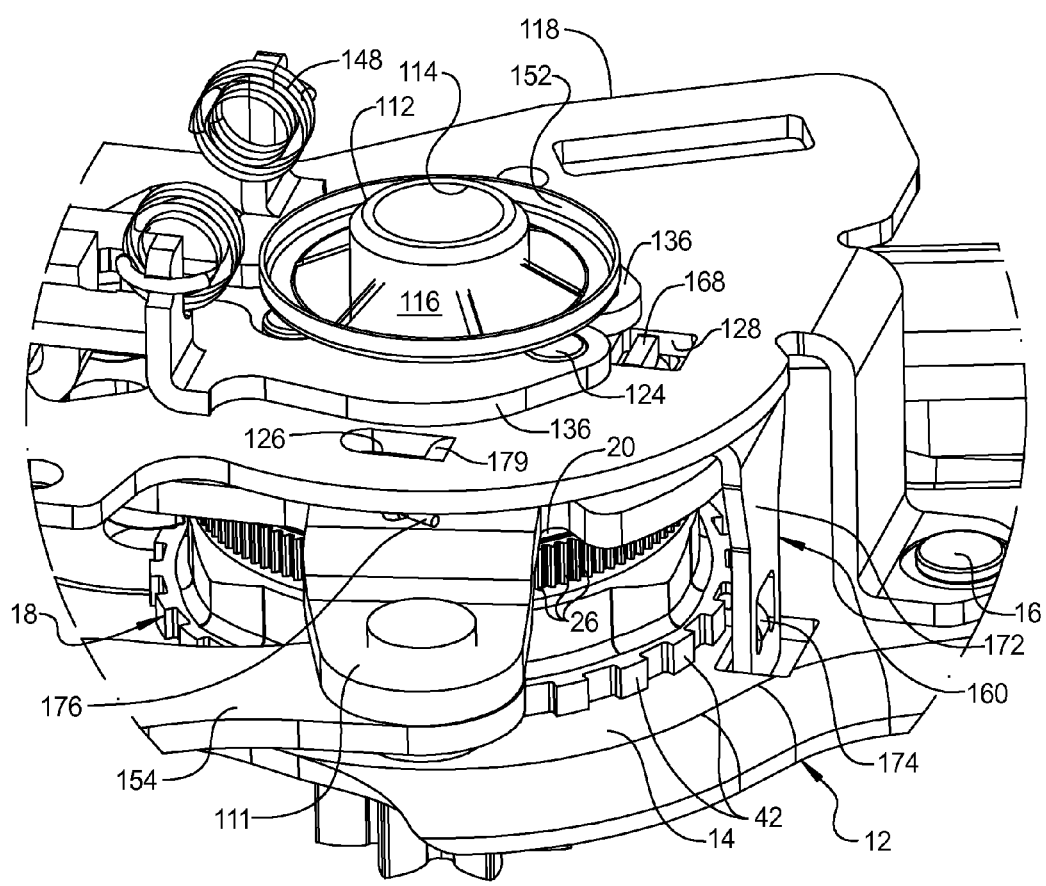
FIG. 6 is a perspective view of the manual seat height adjuster mechanism of FIG. 1.
Figure 7:
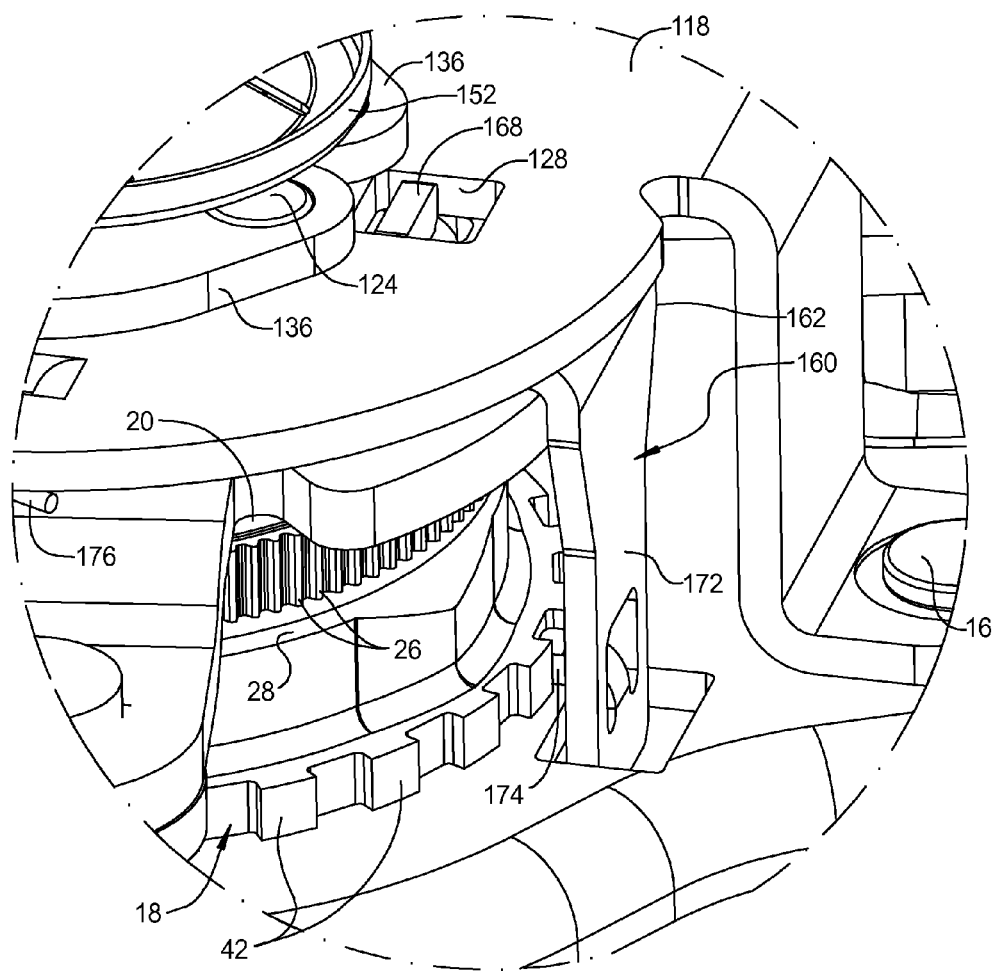
FIG. 7 is an enlarged perspective view of a portion of the manual seat height adjuster mechanism of FIG. 6.
Figure 8:
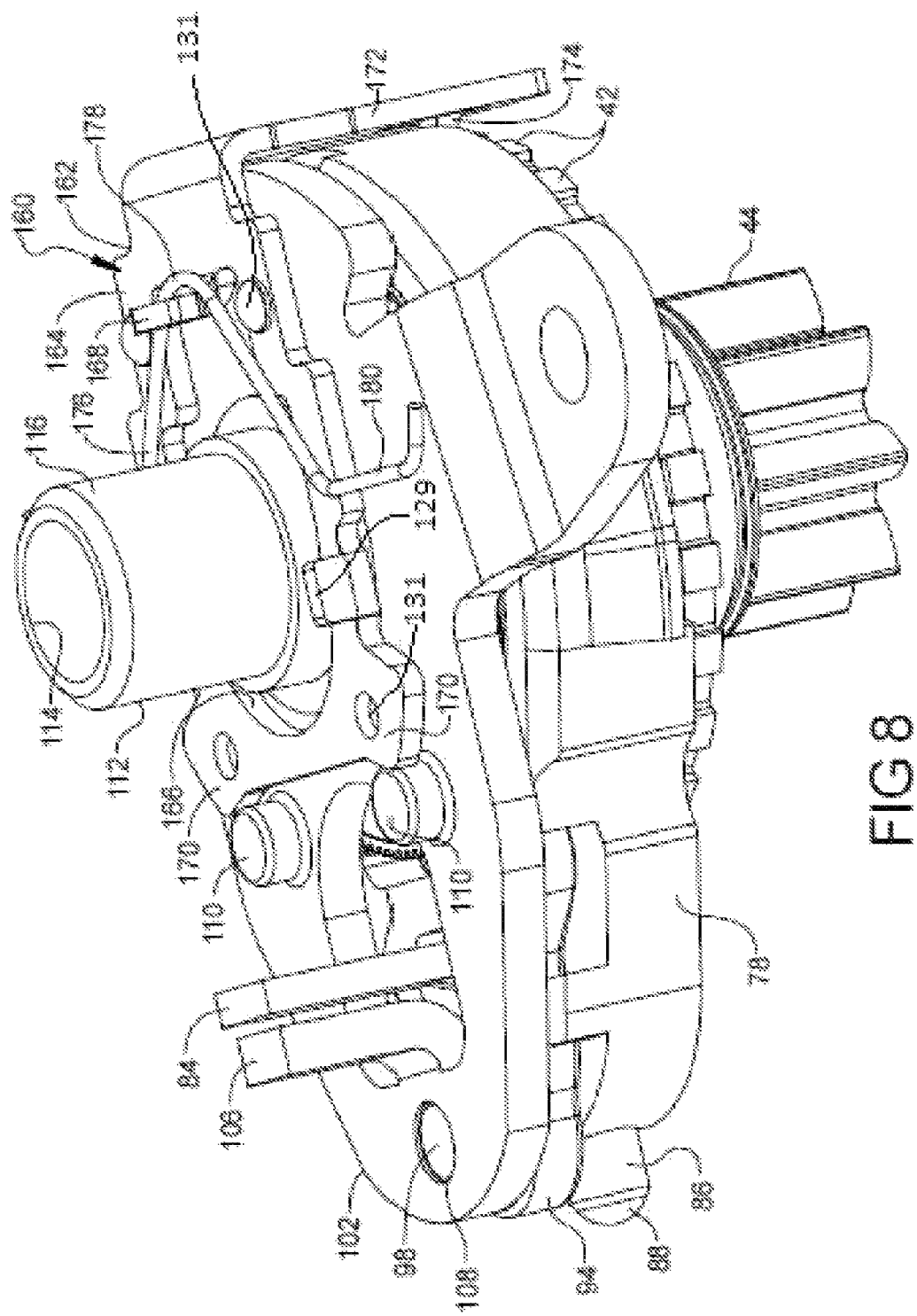
FIG. 8 is a perspective view of a portion of the manual seat height adjuster mechanism of FIG. 6.
Figure 9:
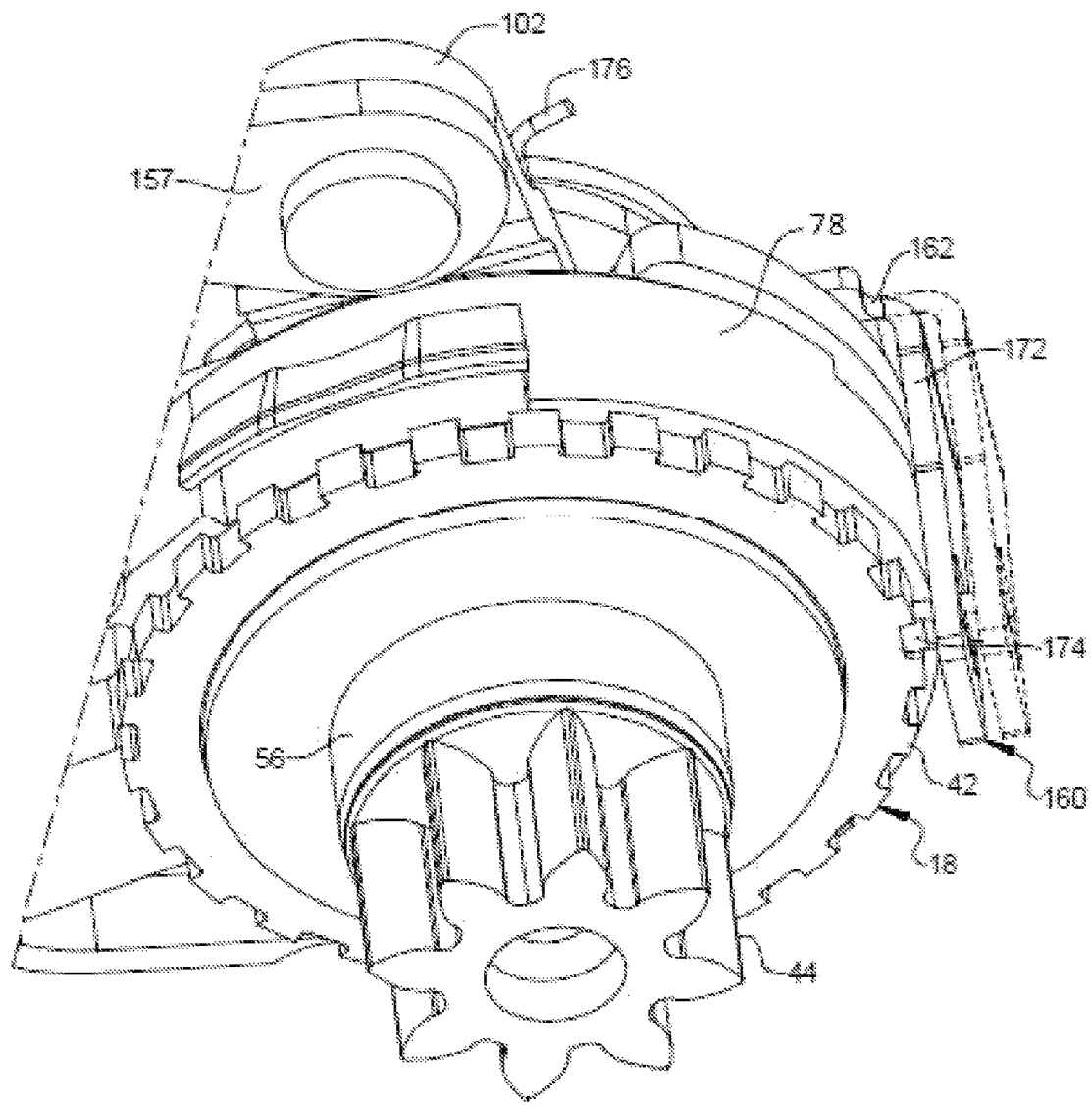
FIG. 9 is a perspective view of a portion of the manual seat height adjuster mechanism of FIG. 6 illustrating a first and second operational state.
Figure 12:
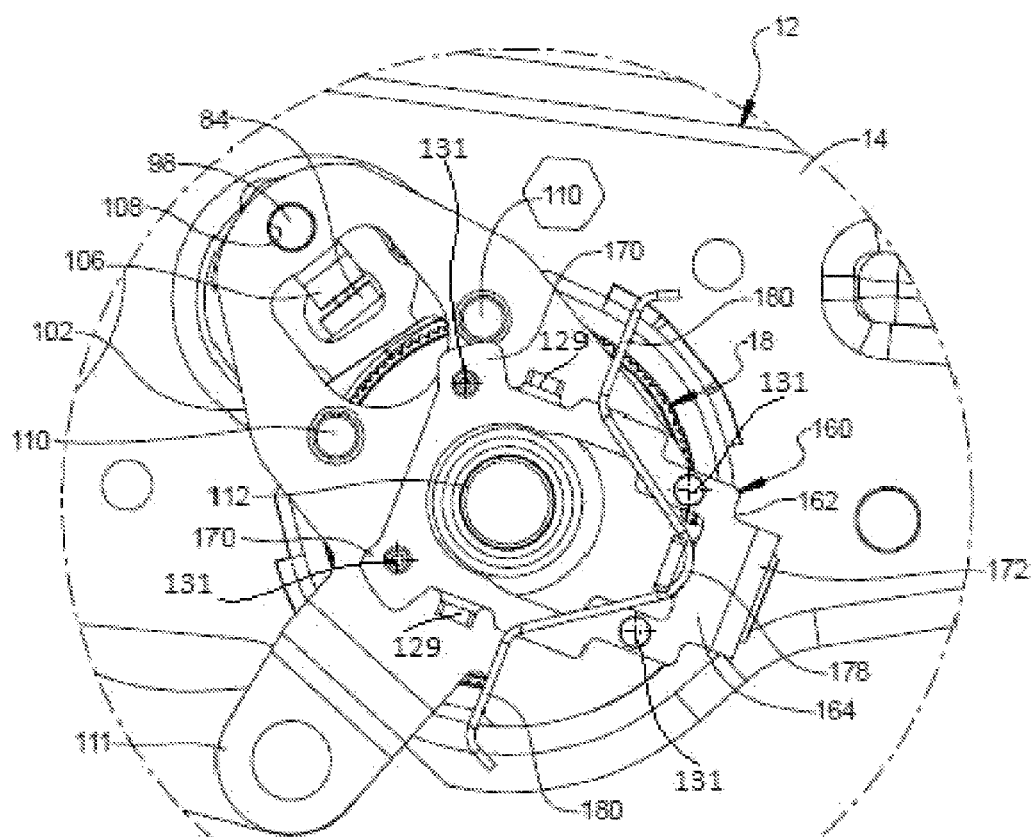
FIG. 12 is a plan view of a portion of the manual seat height adjuster mechanism of FIG. 11 in the second operational state.

Referring to either FIGS. 6 through 8, when the manual seat height adjuster mechanism 10 is in a neutral position, the flange 174 of the locking plate 162 is disposed in a space between the teeth 42 of the brake housing 28 to prevent rotational movement of the brake housing 28. During the drive motion of the actuating lever 102, rotation of the actuating lever 102 causes the post 124 to engage and follow the cam portion 170 of the locking plate 162 as illustrated in FIG. 12. When this occurs, the locking plate 162 slides linearly and outwardly such that the flange 174 disengages the space between the teeth 42 of the brake housing 28, thereby allowing rotation of the brake housing 28, as illustrated in phantom lines in FIG. 9. During the return motion of the actuating lever 102, rotation of the actuating lever 102 causes the post 124 to follow the cam portion 170 of the locking plate 162 and the tension spring 176 urges the locking plate 162 linearly inwardly such that the flange 174 engages the space between the teeth 42 of the brake housing 28, thereby preventing rotation of the brake housing 28, as illustrated by the solid lines in FIG. 9. It should be appreciated that the locking mechanism 160 provides a positive mechanical lock to prevent the reversing rotational movement of the output pinion 44 and brake housing 28.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A manual seat height adjuster mechanism for a seat of a vehicle comprising:
a freewheel brake mechanism having a rotatable output pinion to engage and rotate an adjustment component of the seat to adjust a height position of the seat upward and downward, said freewheel brake mechanism having a brake housing being connected to said output pinion;
said freewheel brake mechanism having a ratchet gear cooperating with said brake housing to rotate said brake housing and said output pinion, said ratchet ear having a plurality of teeth;
said freewheel brake mechanism having a carrier to cooperate with said teeth of said ratchet gear;
said freewheel brake mechanism having an actuating lever cooperating with said carrier to move said carrier to engage and disengage said teeth of said ratchet gear to rotate said ratchet gear, and actuating lever having a pair of posts extending axially and spaced radially from each other;
a supplementary mechanical engagement locking mechanism including a plurality of teeth on said brake housing and a locking plate movable linearly and radially relative to said teeth of said brake housing to selectively engage and disengage said teeth of said brake housing of said freewheel brake mechanism to allow the height position of the seat to be adjusted and to prevent reversing rotational movement of said brake housing an said output pinion once the height position of the seat has been adjusted; and
said locking plate having a base portion, an arm portion extending generally perpendicular from said base portion, a tab extending generally perpendicular from said arm portion, and a pair of cam portions extending outwardly to engage and disengage said post of said actuating lever of said freewheel brake mechanism to move said locking plate to engage and disengage said tab with a space between said teeth of said brake housing of said freewheel brake mechanism.

2. A manual seat height adjuster mechanism as set forth in claim 1 wherein said locking mechanism includes a tension spring cooperating with said locking plate to urge said locking plate into engagement with said teeth of said brake housing of said freewheel brake mechanism.

3. A manual seat height adjuster mechanism as set forth in claim 2 wherein said tension spring has a generally inverted V-shaped portion cooperating with said locking plate and a pair of arm portions extending from said V-shaped portion cooperating with said freewheel brake mechanism.

4. A manual seat height adjuster mechanism as set forth in claim 1 wherein said freewheel brake mechanism includes a locking bushing disposed about a portion of said output pinion and fixed relative to said output pinion.

5. A manual seat height adjuster mechanism as set forth in claim 4 wherein said freewheel brake mechanism includes at least one roller disposed between said locking bushing and said brake housing.

6. A manual seat height adjuster mechanism as set forth in claim 5 wherein said freewheel brake mechanism includes at least one elastic insert disposed between said locking bushing and said brake housing and adjacent said at least one roller.

7. A manual seat height adjuster mechanism as set forth in claim 1 wherein said freewheel brake mechanism includes a spline connection between said output pinion and said brake housing.

8. A manual seat height adjuster mechanism for a seat of a vehicle comprising:
a freewheel brake mechanism having a rotatable output pinion to engage and rotate an adjustment component of the seat to adjust a height position of the seat upward and downward, said freewheel brake mechanism having a brake housing with a plurality of slots and being connected to said output pinion;
said freewheel brake mechanism having a ratchet gear with a plurality of teeth and a plurality of fingers received in said slots for cooperating with said brake housing to rotate said brake housing and said output pinion;

said freewheel brake mechanism having a carrier to cooperate with said teeth of said ratchet gear;

said freewheel brake mechanism having an actuating lever cooperating with said carrier to move said carrier too engage and disengage said teeth of said ratchet gear to rotate said ratchet gear, said actuating lever having a pair of posts extending axially and spaced radially from each other;

a mechanical engagement locking mechanism comprising a plurality of teeth on an exterior surface of said brake housing and a locking plate cooperating with said teeth of said brake housing of said freewheel brake mechanism and a tension spring cooperating with said locking plate to urge said locking plate into engagement with said teeth of said brake housing of said freewheel brake mechanism, said locking plate being movable linearly on said actuating lever to selectively engage and disengage spaces between said teeth of said brake housing of said freewheel brake mechanism to allow the height position of the seat to be adjusted and to prevent a drop of the height position of the seat once the height position of the seat has been adjusted; and said locking plate having a base portion, an arm portion extending generally perpendicular from said base portion, a tab extending generally perpendicular from said arm portion, and a pair of cam portions extending outwardly to engage and disengage said post of said actuating lever of said freewheel brake mechanism to move said locking plate to engage and disengage said tab with a space between said teeth of said brake housing of said freewheel brake mechanism.

9. A manual seat height adjusted mechanism as set forth in claim 8 wherein said tension spring has a generally inverted V-shaped portion cooperating with said locking plate and a pair of arm portions extending from said V-shaped portion cooperating with said freewheel brake mechanism.

10. A manual seat height adjuster mechanism for a seat of a vehicle comprising:

a freewheel brake mechanism having a rotatable output pinion to engage and rotate an adjustment component of the seat to adjust a height position of the seat upward and downward, said freewheel brake mechanism having a brake housing with a plurality of slots spaced circumferentially and a plurality of teeth on an exterior surface thereof, said brake housing being connected to said output pinion;

said freewheel brake mechanism having a ratchet gear with a plurality of teeth and a plurality of fingers spaced circumferentially and received in said slots for cooperating with said brake housing to rotate said brake housing and said output pinion;

said freewheel brake mechanism having a carrier to cooperate with said teeth of said ratchet gear and an actuating lever cooperating with said carrier to move said carrier to engage and disengage said teeth of said ratchet gear to rotate said ratchet gear, said actuating lever having a pair of posts extending axially and spaced radially from each other;

a locking plate cooperating with said actuating lever of said freewheel brake mechanism and a tension spring cooperating with said locking plate to urge said locking plate into engagement with said teeth of said brake housing of said freewheel brake mechanism, said locking plate being movable linearly to selectively engage and disengage spaces between said teeth of said brake housing of said freewheel brake mechanism to allow the height position of the seat to be adjusted and to prevent reversing rotational movement of said brake housing and said output pinion once the height position of the seat has been adjusted; and said locking plate having a base portion, an arm portion extending generally perpendicular from said base portion, a tab extending generally perpendicular from said arm portion, and a pair of cam portions extending outwardly to engage and disengage said post of said actuating lever of said freewheel brake mechanism to move said locking plate to engage and disengage said tab with a space between said teeth of said brake housing of said freewheel brake mechanism.

* * * * *

UNITED STATES PATENT AND TRADEMARK OFFICE
CERTIFICATE OF CORRECTION

PATENT NO. : 8,496,098 B1  
APPLICATION NO. : 12/342784  
DATED : July 30, 2013  
INVENTOR(S) : Ioan Napau et al.

Page 1 of 1

It is certified that error appears in the above-identified patent and that said Letters Patent is hereby corrected as shown below:

In the Claims:

Column 8, line 3 delete "ear" and insert therefor --gear--.

Column 8, line 10 delete "and" and insert therefor --said--.

Column 8, line 27 delete "post" and insert therefor --posts--.

Column 9, line 6 delete "too" and insert therefor --to--.

Column 9, line 29 delete "post" and insert therefor --posts--.

Column 9, line 34 delete "adjusted" and insert therefor --adjuster--.

Column 10, line 37 delete "post" and insert therefor --posts--.

Signed and Sealed this  
Twenty-sixth Day of November, 2013

Margaret A. Focarino  
*Commissioner for Patents of the United States Patent and Trademark Office*